(12) United States Patent
Vesma et al.

(10) Patent No.: US 8,711,801 B2
(45) Date of Patent: Apr. 29, 2014

(54) SYSTEM AND METHOD FOR BURST SEPARATION AND EXTENDED INTERLEAVING LENGTH

(75) Inventors: Jussi Kalevi Vesma, Turku (FI); Harri Juhani Pekonen, Raisio (FI); Heidi Johanna Himmanen, Turku (FI)

(73) Assignee: Nokia Corporation, Espoo (FI)

( * ) Notice: Subject to any disclaimer, the term of this patent is extended or adjusted under 35 U.S.C. 154(b) by 742 days.

(21) Appl. No.: 12/359,180

(22) Filed: Jan. 23, 2009

(65) Prior Publication Data

US 2009/0303958 A1 Dec. 10, 2009

Related U.S. Application Data

(60) Provisional application No. 61/024,481, filed on Jan. 29, 2008.

(51) Int. Cl.
*H04W 4/00* (2009.01)

(52) U.S. Cl.
USPC .......................................... 370/330; 370/436

(58) Field of Classification Search
USPC .................... 370/310–347, 431–463
See application file for complete search history.

(56) References Cited

U.S. PATENT DOCUMENTS

| | | | |
|---|---|---|---|
| 6,094,425 A * | 7/2000 | Auger et al. ................... | 370/330 |
| 2007/0088971 A1* | 4/2007 | Walker et al. ..................... | 714/4 |
| 2007/0277077 A1 | 11/2007 | Vesma et al. | |
| 2008/0137562 A1* | 6/2008 | Li et al. .......................... | 370/280 |
| 2008/0279220 A1* | 11/2008 | Wang .............................. | 370/500 |
| 2009/0067384 A1 | 3/2009 | Himmanen et al. | |
| 2009/0097446 A1 | 4/2009 | Pekonen et al. | |
| 2010/0246719 A1* | 9/2010 | Ko et al. ........................ | 375/303 |
| 2011/0044401 A1* | 2/2011 | Ko et al. ........................ | 375/295 |

FOREIGN PATENT DOCUMENTS

| | | |
|---|---|---|
| CN | 1777058 A | 5/2006 |
| EP | 1404144 A1 | 3/2004 |
| WO | 2007002270 A1 | 1/2007 |
| WO | 2008110886 A2 | 9/2008 |
| WO | 2008149263 A2 | 12/2008 |
| WO | 2009040752 A1 | 4/2009 |

OTHER PUBLICATIONS

Frame structure channel oding and modulation for a second generation digital terrestrial televison broadcasting system (DVB-T2), Jan. 2008.*

(Continued)

*Primary Examiner* — Ricky Ngo
*Assistant Examiner* — We-Po Kao
(74) *Attorney, Agent, or Firm* — Nokia Corporation

(57) ABSTRACT

A method includes allocating frame capacity between physical layer pipes dividing a frame and physical layer pipes into a plurality of subframes, wherein each subframe carries one burst from each physical layer pipe; selectively time shifting the plurality of bursts such that a defined time shift exists between corresponding bursts in each subframe within the frame; and appending the subframes after each other in a sequence. Each frame may include two or more radio frequency channels, each radio frequency channel including subframes. The method may further include selectively time shifting one or more of the radio frequency channels such that a defined time shift exists between corresponding radio frequency channels in each frame; and for any subframes of a radio frequency channel which have been selectively shifted beyond the end of the frame, cyclically shifting such subframes to the beginning of the frame.

13 Claims, 12 Drawing Sheets

(56) References Cited

OTHER PUBLICATIONS

U.S. Appl. No. 61/013,298.*
U.S. Appl. No. 61/013,643.*
U.S. Appl. No. 61/015,194.*
"International Search Report and the Written Opinion of the International Searching Authority", received in corresponding PCT Application No. PCT/FI2009/000015, Dated May 25, 2009, 18 pages.
U.S. Appl. No. 60/941,927, "System and Method for Scheduling and Transferring Data Through a Transmission System", filed Jun. 4, 2007, 44 pages.
U.S. Appl. No. 60/970,197, "Method and System to Enable Simultaneous Reception of Plurality of Services in DVB Systems", filed Sep. 5, 2007, 27 pages.
U.S. Appl. No. 60/970,671, "Method and System to Guarantee Service Reception Within Broadcast System", filed Sep. 7, 2007, 36 pages.
Office Action received for corresponding Chinese Patent Application No. 200980103468.0, dated Aug. 31, 2012, 6 pages, No English Language Translation available.
Office Action received for corresponding Chinese Patent Application No. 200980103468.0, dated May 13, 2013, 3 pages, No English Language Translation available.
Office Action received for corresponding Chinese Application No. 2000980103468.0, dated Dec. 9, 2013, 5 pages.

* cited by examiner

SYSTEM AND METHOD FOR BURST SEPARATION AND EXTENDED INTERLEAVING LENGTH

FIELD OF THE INVENTION

The present invention relates generally to the transferring of data in a transmission system. More particularly, the present invention relates to the use of time-frequency slicing (TFS) for data transmission.

BACKGROUND OF THE INVENTION

Digital broadband broadcast networks enable end users to receive digital content including video, audio, data, etc. Using a mobile terminal, a user may receive digital content over a wireless digital broadcast network.

The capacity of a wireless transmission channel, in a broadcasting system, for example, can be divided between different services by using time-division multiplexing (TDM). Each service reserves a slot in a TDM frame, which results in a fixed bit rate. The bit rate is determined by the size of the slot and the frame interval. Some services, such as a real-time video service, can have a variable bit rate.

TDM capacity has typically been reserved according to the maximum bit rate of the video service in order to guarantee that the stream always fits into the reserved slot. Most of the time, however, the reserved slots are not completely filled resulting in wasted transmission capacity.

Systems have been identified to more completely fill reserved TDM slots in order to reduce wasted transmission capacity. However, it is still desirable to provide a system and method by which transmission capacity can be further increased, for example to increase the number of services that may be provided.

SUMMARY OF THE INVENTION

In one aspect of the invention, a method includes allocating frame capacity between physical layer pipes (PLP), dividing a frame and PLP's into a plurality of subframes, wherein each subframe carries one burst from each PLP; selectively time shifting the plurality of bursts such that a defined time shift exists between corresponding bursts in each subframe within the frame; and appending the subframes after each other in a sequence.

In one embodiment, each PLP comprises data from one service. In one embodiment, a computer program product, embodied in a computer-readable medium, comprises computer code configured to implement the method.

In another embodiment, each frame includes two or more radio frequency (RF) channels, each RF channel including subframes. The method further includes selectively time shifting one or more of the RF channels such that a defined time shift exists between corresponding channels in each frame; and for any subframes of a channel which have been selectively shifted beyond the end of the frame, cyclically shifting such subframes to the beginning of the frame. The time shift between RF channels can be also variable from one RF channel to the next.

In another aspect, the invention relates to an apparatus comprising a processor and a memory unit communicatively connected to the processor. The memory unit includes computer code for allocating frame capacity between PLP's, dividing a frame and PLP's into a plurality of subframes, wherein each subframe carries one burst from each PLP; computer code for selectively time shifting the plurality of bursts such that a defined time shift exists between corresponding bursts in each subframe within the frame; and computer code for appending the subframes after each other in a sequence.

In another aspect of the invention, an apparatus includes means for allocating frame capacity between PLP's, dividing a frame and PLP's into a plurality of subframes, wherein each subframe carries one burst from each PLP; means for selectively time shifting the plurality of bursts such that a defined time shift exists between corresponding bursts in each subframe within the frame; and means for appending the subframes after each other in a sequence.

DETAILED DESCRIPTION OF THE EMBODIMENTS

Figure 1:
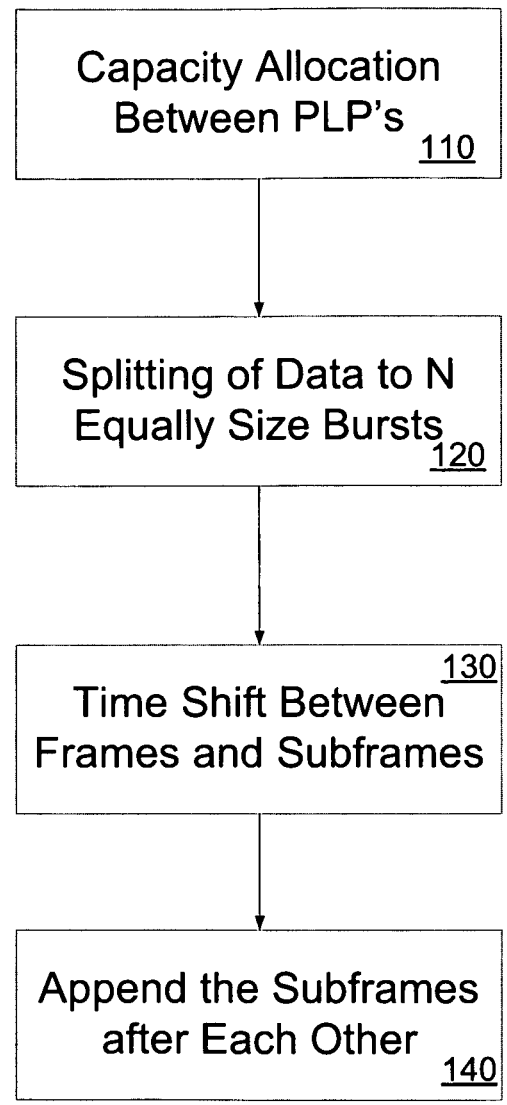
FIG. 1 is a flow chart illustrating the a procedure for burst separation and extended interleaving length according to one exemplary embodiment.

Embodiments of the invention relate to the second generation Digital Video Broadcasting-Terrestrial (DVB-T2) system. There are two main variants in T2. The first, variant B (or FF mode), is for single radio frequency (RF) channel (NUM_RF=1) and the second, variant C (or TFS mode), is for a system using multiple RF channels (in exemplary embodiments NUM_RF=2, 3, 4, 5, 6, but not limited thereto). Variant C is the same as time frequency slicing (TFS). In both variants the capacity of transmission channel is shared between multiple physical layer pipe (PLP) by using time division multiplexing (TDM). Each PLP can have its own robustness (e.g., modulation, code rate) and bit rate. PLP can carry one or more services. Instantaneous bit rate of the PLP in one frame interval can vary according to the bit rate variation of the services. However, the total bit rate of the PLP's can not exceed the bit rate of the transmission system.

Because of the dynamic sharing of the channel between PLP's, statistical multiplexing gain can be achieved. Statistical multiplexing gain means that one service can have temporarily lower bit rate, this allowing some service to have temporarily higher bit rate.

TFS, variant C, can have higher statistical multiplexing gain than single RF case, variant B, because there can be more services.

Time interleaving in variant B and C is limited. Firstly time interleaving is done only over one T2 frame. Secondly there is only one burst or slot or slice in one T2 frame in one RF. For variant B, interleaving is done over this one burst, which can be very short for low bit rate services.

TFS scheduling has been disclosed in a U.S. provisional application 60/941,927, filed Jun. 4, 2007, titled: System and Method to Schedule and Transfer Data Through Transmission System, incorporated herein by reference in its entirety. Further, U.S. provisional application 60/970,197, filed Sep. 5, 2007, titled: Method and System to Enable Simultaneous Reception of Plurality of Services in DVB-T2 Systems and U.S. provisional application 60/970,671, filed Sep. 7, 2007, titled: Method and System to Guarantee Service Reception Within Broadcast System are also incorporated herein by reference in their entirety. Further, reference may be made to U.S. Application 2007/0277077 titled: Burst Transmission in a Digital Broadcasting Network, which is also incorporated herein by reference in its entirety.

Embodiments relate to a uniform procedure and signaling for variants B and C to make burst separation and extended interleaving length.

For burst separation or sub-slicing, instead of sending one burst or slice, a burst is divided into multiple bursts or sub-slices which are sent separately. This gives longer interleaving length. For extended interleaving length, an interleaving block may cover multiple T2 frames instead of one.

In extended interleaving length, there must be a integer number of interleaving periods per super frame. The start of the interleaving periods are synchronized to the frames having a FRAME_INDEX of FRAME_INDEX=$n$* INTERLEAVING_LENGTH, where n=0, 1, 2, . . . , SUPER_FRAME_LENGTH/INTERLEAVING_LENGTH.

FIG. 1 is a flow chart illustrating a procedure for burst separation and extended interleaving length according to one exemplary embodiment. The signalling parameters and the field sizes are given for an exemplary embodiment. Four signaling parameters may be used:

INTERLEAVING_LENGTH [8b]=The length of the interleaving (or interleaving block) in T2 frames.

NUM_SUBFRAME [8b]=The number of subframes (or bursts) in T2 frame in one RF channel.

NUM_RF=Number of RF channels (=1 for variant B, 2-6 for Variant C)

BURST_INTERVAL [8], which is frame specific, determines the interval of the bursts. For a given PLP, this is the interval from the beginning of the burst to the beginning of the next burst. The value is the same for all PLP's. Note that the value is cyclic, i.e., if it points outsize of the frame it means that the burst is cyclically shifted to the beginning of the frame. BURST_INTERVAL is related to other parameters as:

BURST_INTERVAL=FRAME_LENGTH/
(NUM_SUBFRAMES*NUM_RF), where NUM_SUBFRAMES is the number of bursts in one frame in one RF.

Note that the definition of the BURST_INTERVAL in the above equation is the same as for RF_SHIFT. Therefore BURST_INTERVAL can be used to replace RF_SHIFT.

Referring again to FIG. 1, at block 110, capacity allocation between PLP's is performed. In this regard, the data from each PLP is written into the T2 frame buffer. The amount of data varies according to bit rate variations of the services. When the frame time indicated by Frame_length is passed, the data written in so far is passed to the next step. The frame time (Frame_length) may be expressed in number of OFDM symbols or in units of time. There can be unused capacity in the frame as padding. The size of the frame depends on Frame_length and INTERLEAVING_LENGTH.

At block 120, the data is split into a plurality of equally sized bursts. The T2 frame is horizontally divided into N blocks. The number of bursts, N, may be expressed as:

N=NUM_SUBFRAME*INTERLEAVING_LENGTH*NUM_RF.

The size of the bursts is the same for one PLP in one frame or interleaving period but varies between PLP's. In one embodiment of the invention, the sizes of the bursts can also vary inside one PLP.

At block 130, the horizontal blocks are shifted by the length of the subframes to perform a time shift between the frames and the subframes. The length of the subframes may be expressed as:

SUBFRAME_LENGTH=FRAME_LENGTH/NUM_
SUBFRAMES.

At block 140, the subframes are appended after each other. Thus, the subframes and/or frames are collected together to form the final T2 frame(s).

FIGS. 2A-2D show the procedure of FIG. 1 applied to four cases for making burst separation and extended interleaving length for variant B. The four cases of FIGS. 2A-2D are examples for different values of NUM_SUBFRAME and INTERLEAVING_LENGTH.

Figure 2A:
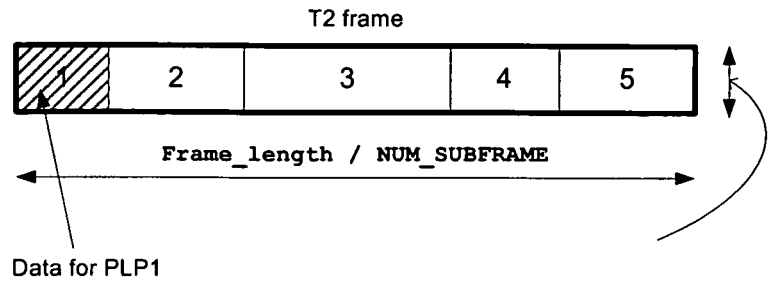
FIGS. 2A-2D show an example of the procedure of FIG. 1 applied to four cases for making burst separation and extended interleaving length for variant B.
Figure 2A:
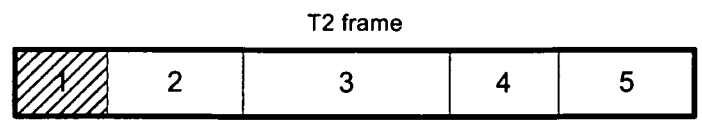

Referring first to FIG. 2A, a basic mode is illustrated with one burst per frame and one frame per interleaver block. The shaded block PLP 1 shows, as an example, one interleaving block. By changing the parameter values, the interleaving time can be extended compared to the basic mode. Since this case includes only one subframe, the steps of blocks 120 and 130 of FIG. 1 are not needed.

Figure 2B:
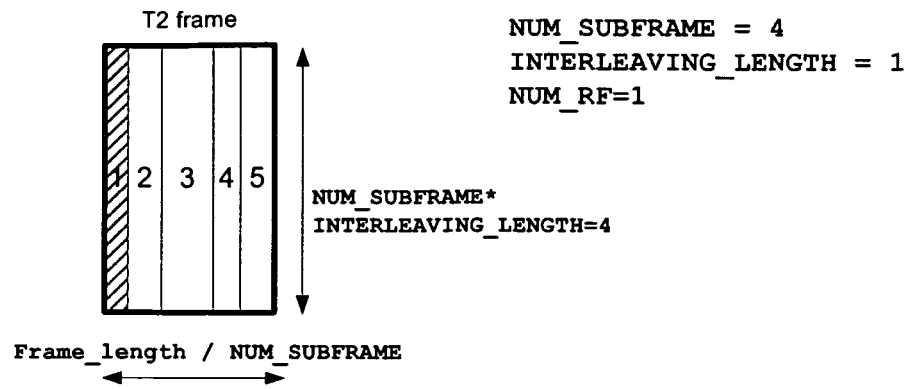
Figure 2B:
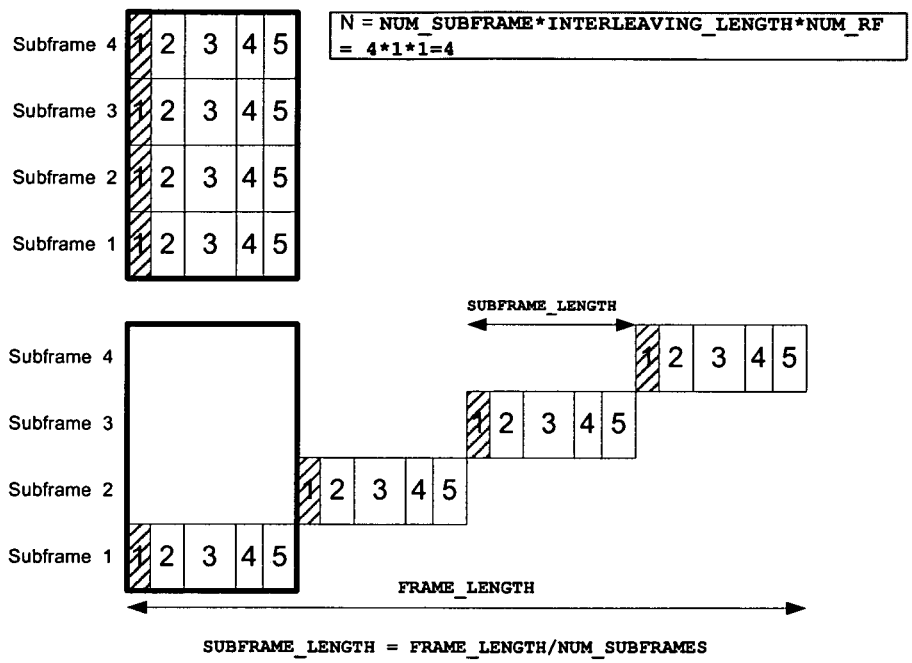
Figure 2B:
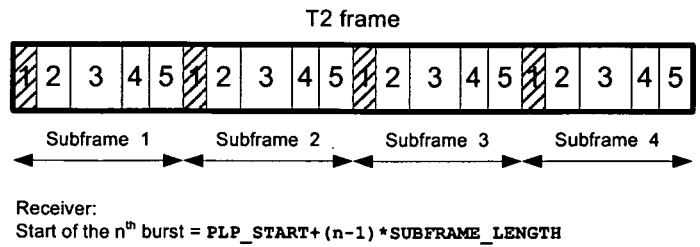

Referring now to FIG. 2B, an example is illustrated with four burst per frame and one frame per interleaver block. Here, the burst is divided into four (NUM_SUBFRAME=4) equally sized smaller bursts. The bursts are shifted and separated by SUBFRAME_LENGTH. The interleaving length is now longer. Finally, the subframes are appended after each other, as illustrated at the bottom of FIG. 2B.

Figure 2C:
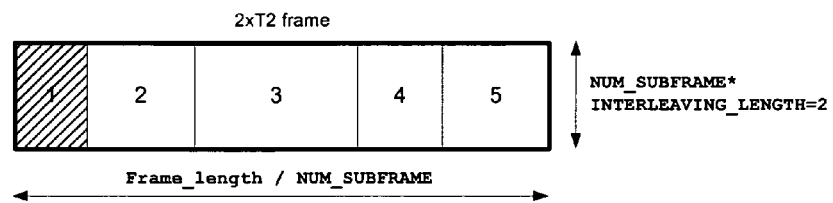
Figure 2C:
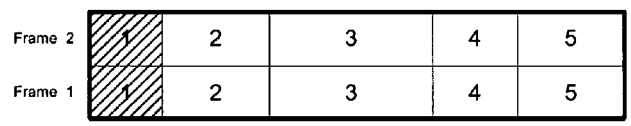
Figure 2C:
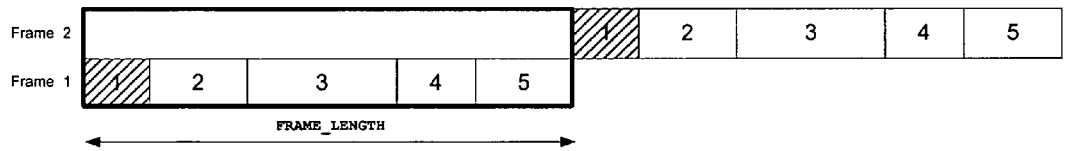
Figure 2C:
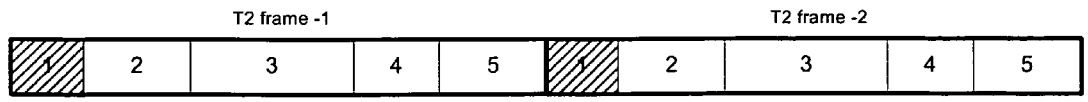

Referring now to FIG. 2C, an example is illustrated with one burst per frame and two frames per interleaver block. The interleaver covers two T2 frames (INTERLEAVING_LENGTH=2). This is needed to get longer interleaving length if the T2 frame length is not long enough. Again, the two frames have one burst each, or two bursts total. The bursts are time shifted and appended after each other.

Figure 2D:
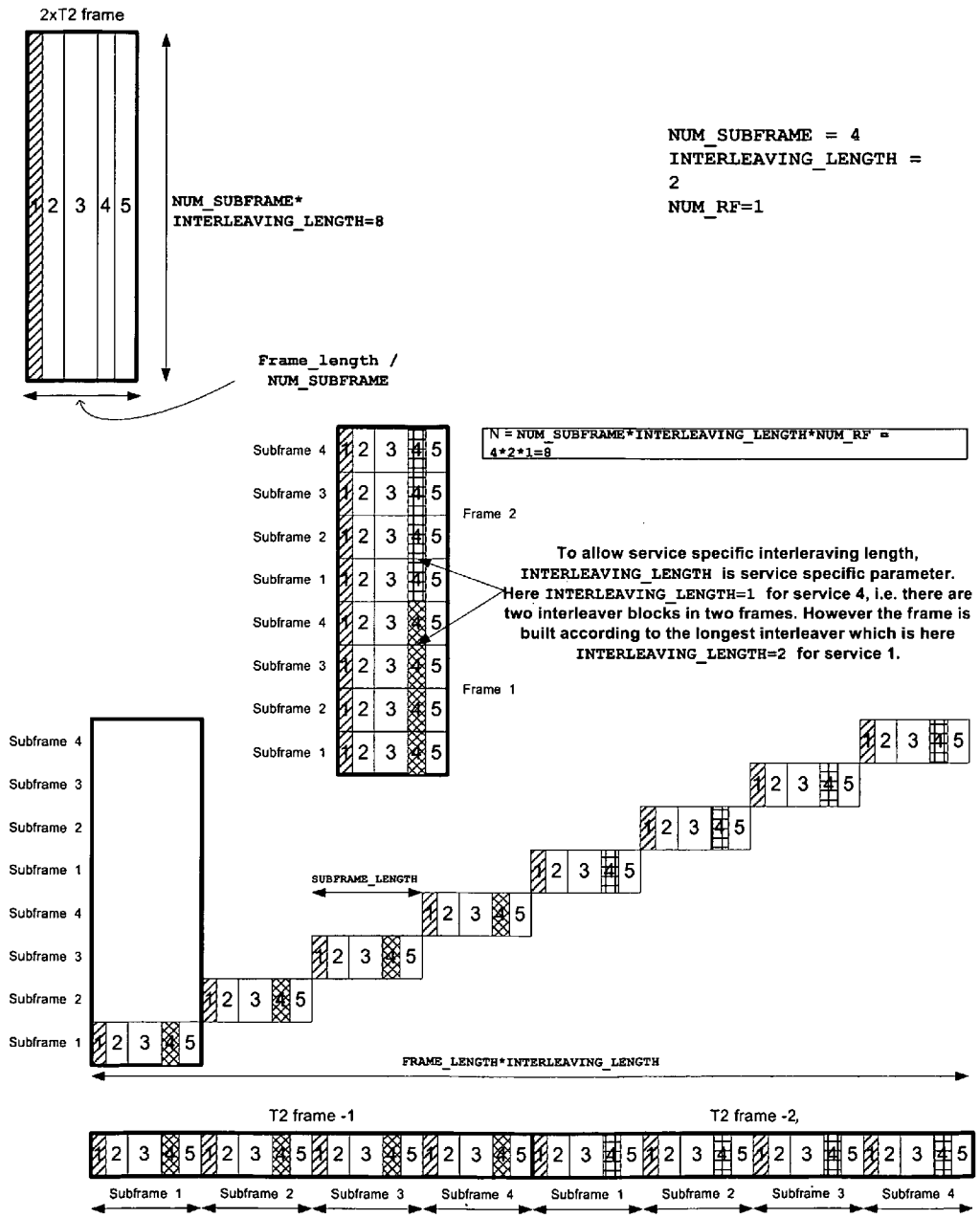

Referring now to FIG. 2D, an example is illustrated with four bursts per frame and two frames per interleaver block. This is a combination of the cases of FIGS. 2B and 2C. The burst is divided into four small bursts inside one frame. This interleaver block covers two frames. Time shifting is performed between the subframes by one subframe length, and the subframes are appended after each other.

The interleaving length could be PLP specific to allow different interleaving length for different services. For example, TV services should have shorter interleaving length (10-400 ms) because the channel zapping time is determined by the interleaving length. In some non-real time services e.g. in file download, interleaving time may be longer (e.g. 1 s-100 s).

Figure 3:
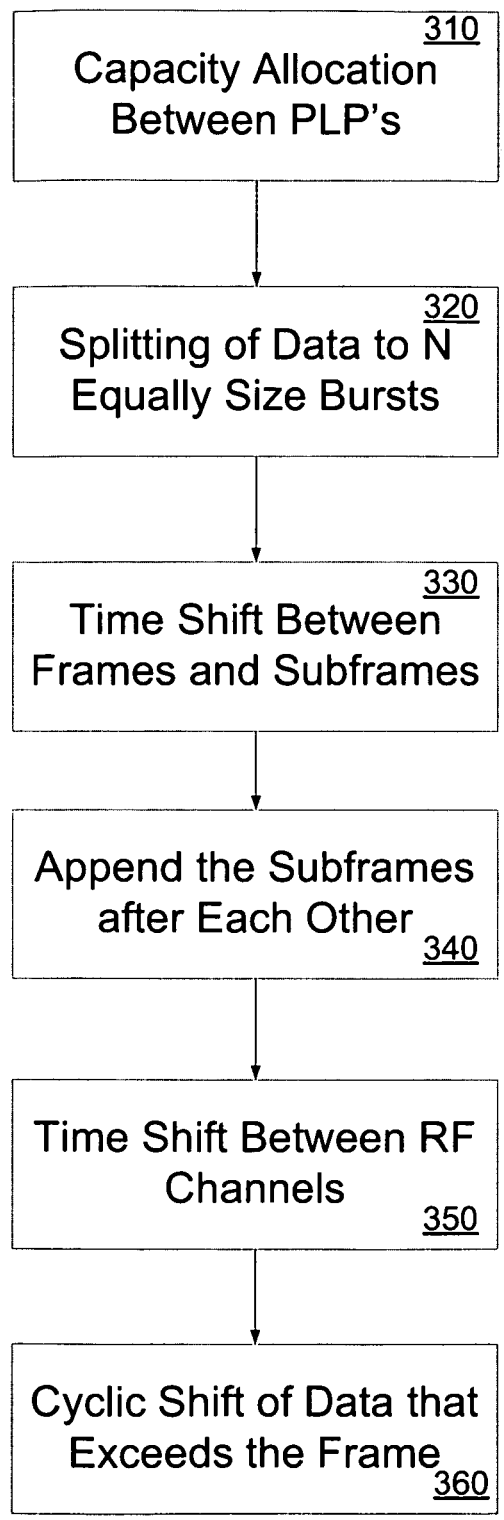
FIG. 3 is a flow chart illustrating a procedure for burst separation and extended interleaving length according to another exemplary embodiment.

FIG. 3 is a flow chart illustrating a procedure for burst separation and extended interleaving length according to another exemplary embodiment. FIG. 3 may be applied to the specific case of Time Frequency Slicing. The flow chart of FIG. 3 includes the same steps of the flow chart of FIG. 1 with two additional steps. Thus, the same parameters and procedures can be applied for both variants.

In addition to blocks 310-340, which correspond to blocks 110-140 of FIG. 1, the flow chart of FIG. 3 includes blocks 350 and 360. At block 350, time shifting is performed between the two or more RF channels. In one embodiment, the time shifting between the RF channels is done by shifting each RF by RF_SHIFT. In one embodiment, RF_SHIFT is expressed as:

RF_SHIFT=FRAME_LENGTH/NUM_RF/NUM_SUBFRAME

At block 360, any data exceeding the frame is cyclically shifted to the beginning of the frame.

FIGS. 4A-4D show the procedure of FIG. 3 applied to four cases for making burst separation and extended interleaving length for variant C. The four cases of FIGS. 4A-4D are examples for different values of NUM_SUBFRAME and INTERLEAVING_LENGTH.

Figure 4A:
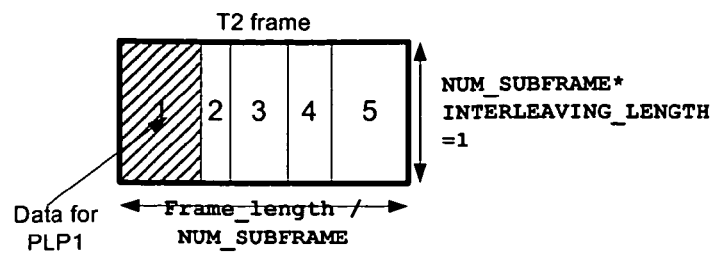
FIGS. 4A-4D show an example of the procedure of FIG. 3 applied to four cases for making burst separation and extended interleaving length for variant C.
Figure 4A:
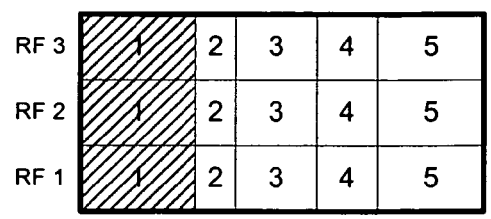
Figure 4A:
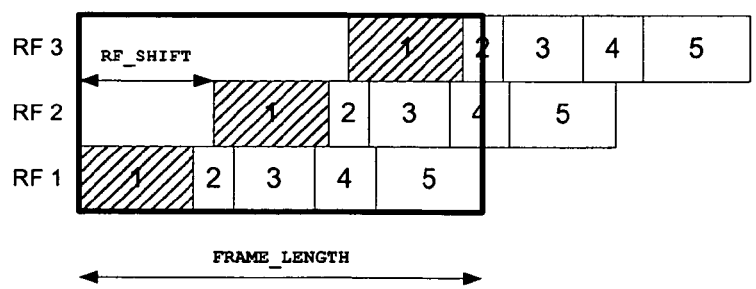
Figure 4A:
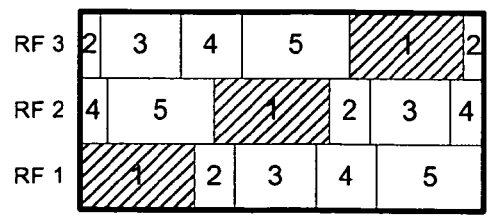

Referring first to FIG. 4A, a basic mode is illustrated with one burst per frame and one frame per interleaver block and three RF channels. As illustrated by the two bottom steps in FIG. 4A, a time shift is performed between the RF channels by shifting each channel by RF_SHIFT with respect to the other channels. The data exceeding the frame is then cyclically shifted to the beginning of the frame.

Figure 4B:
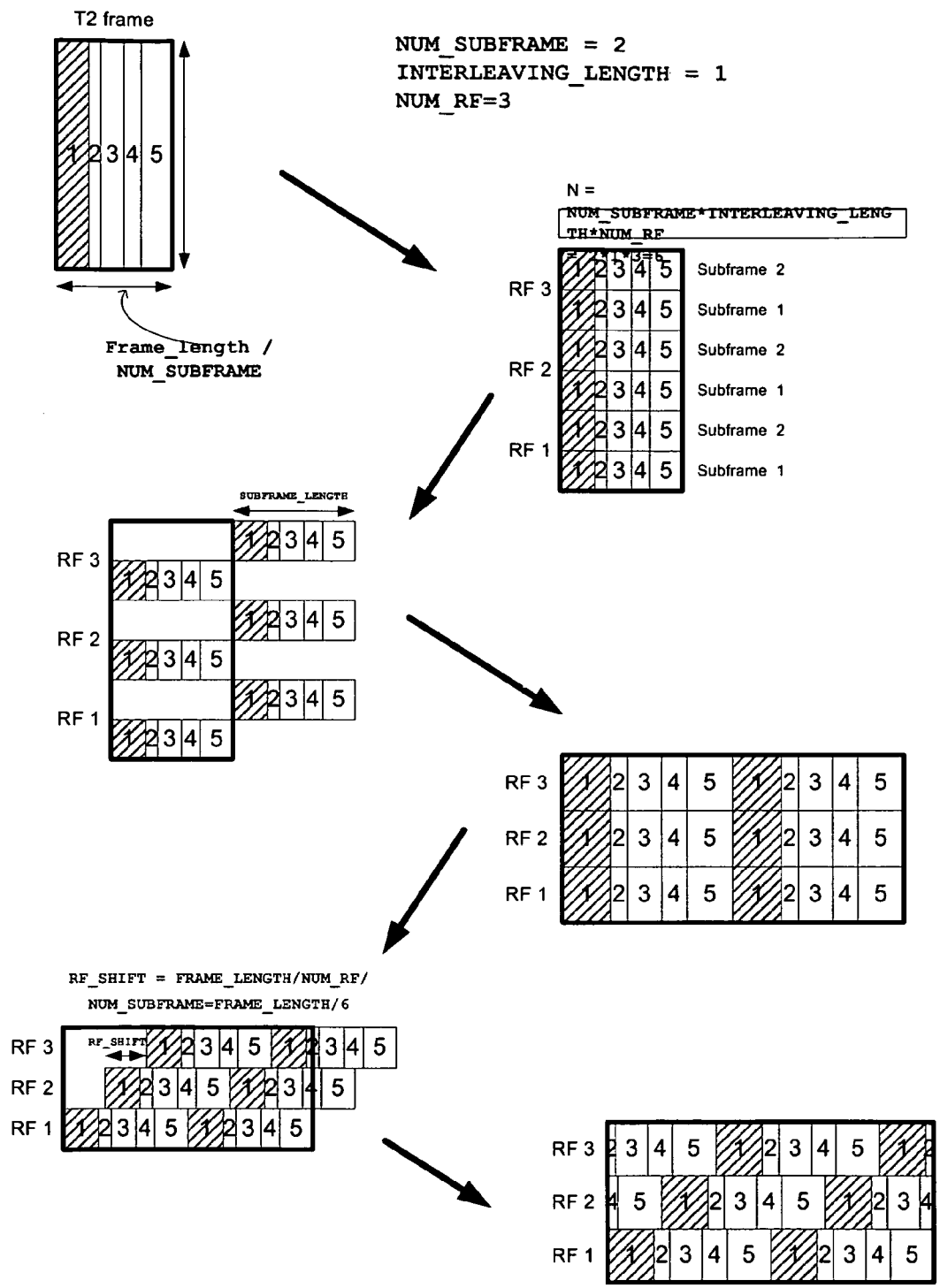

Referring now to FIG. 4B, an example is illustrated with two bursts per frame, one frame per interleaver block and three RF channels. Here, the performance of blocks 310-340 results in the subframes being appended after each other. The RF channels are then time shifted. Any data exceeding each frame is then cyclically shifted to the beginning of that frame.

Figure 4C:
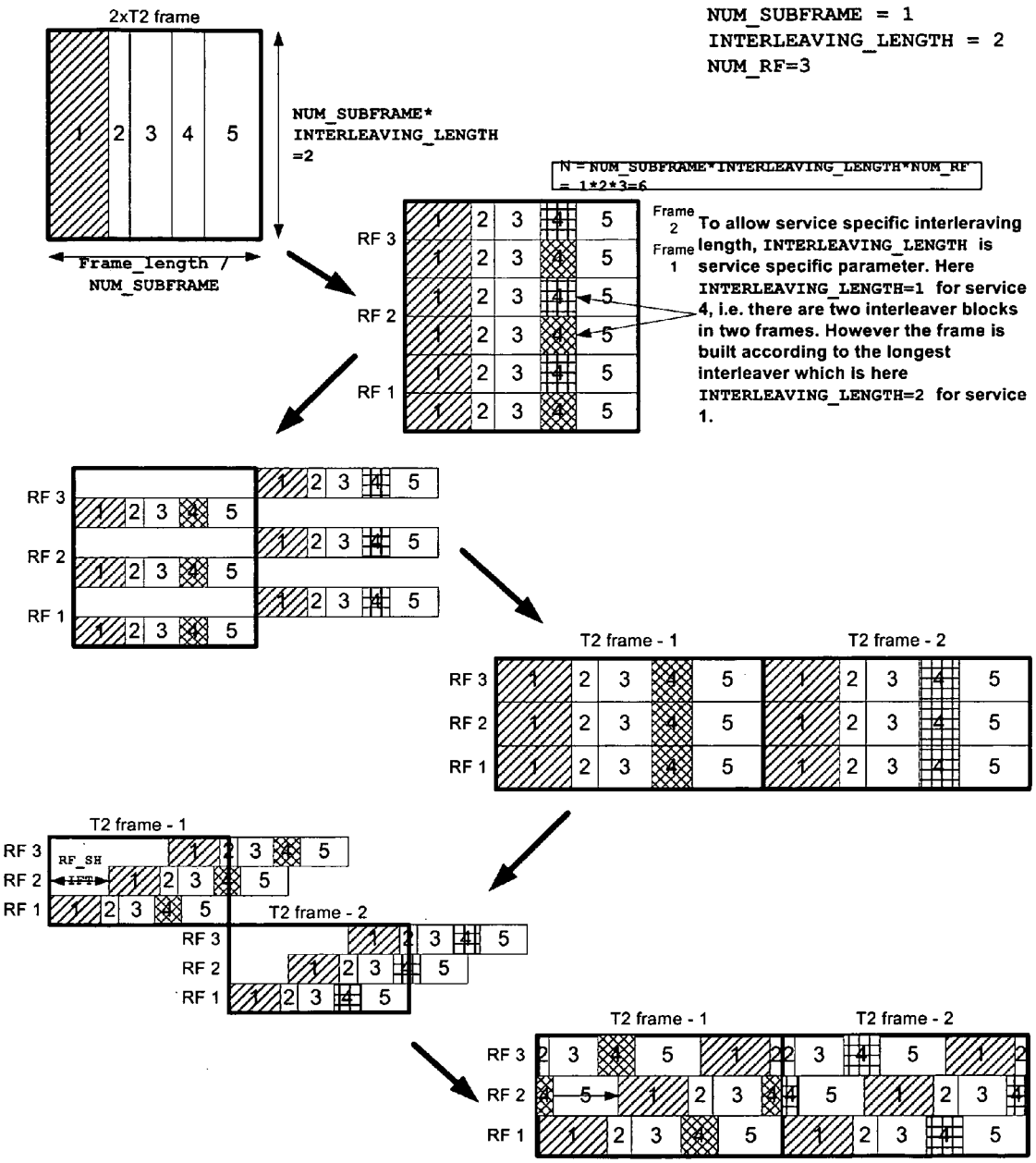

Referring now to FIG. 4C, an example is illustrated with one burst per frame, two frames per interleaver block and three RF channels. Again, after the performance of blocks 310-340, the RF channels in each T2 frame are time shifted. Any data exceeding each frame is then cyclically shifted to the beginning of that frame.

Figure 4D:
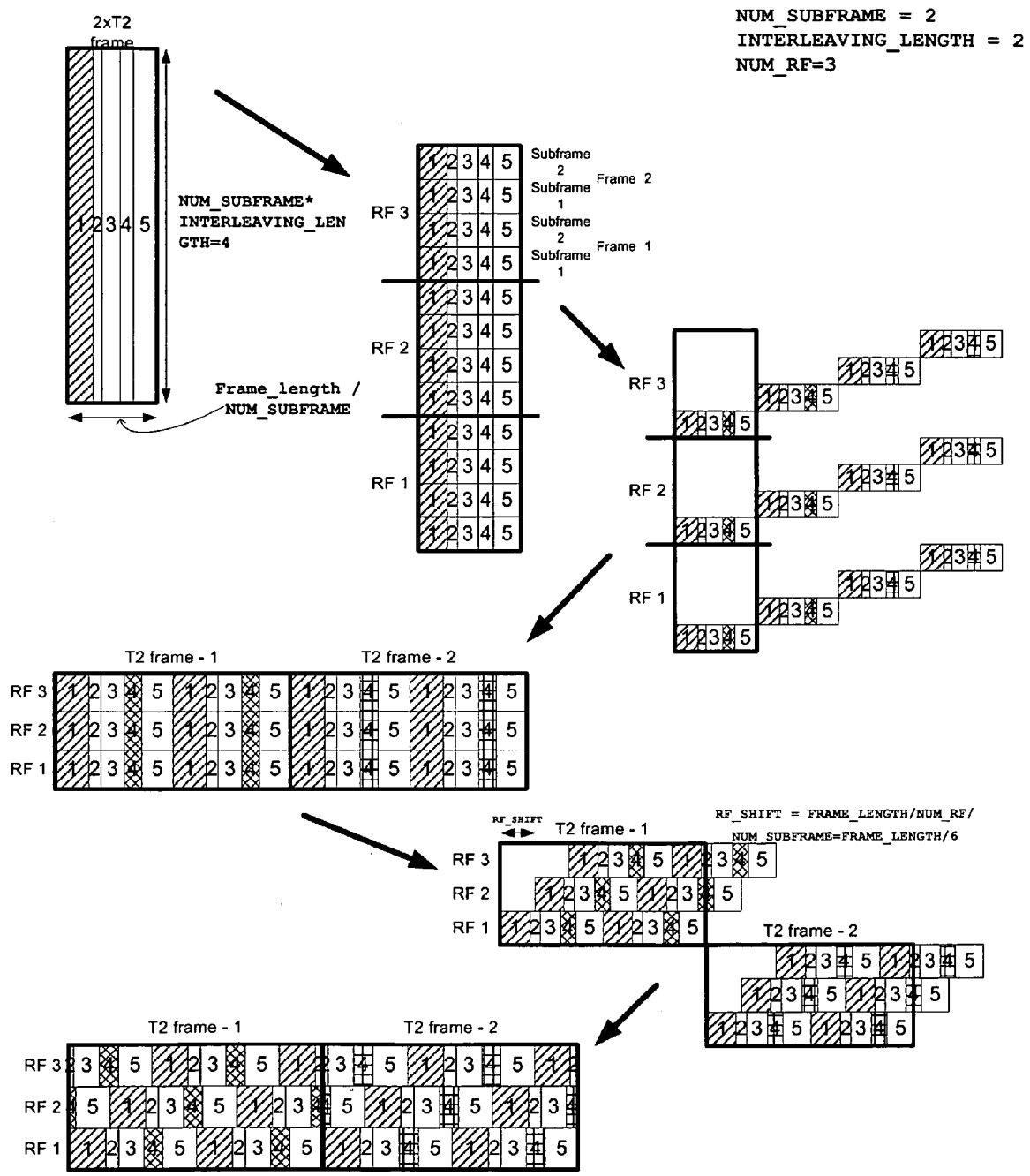

Referring now to FIG. 4D, an example is illustrated with two bursts per frame, two frames per interleaver block and three RF channels. This is a combination of the cases of FIGS. 4B and 4C. Blocks 310-340 of FIG. 3 are applied to each RF channel. Then, each RF channel is time shifted, and any data exceeding each frame is then cyclically shifted to the beginning of that frame.

Receiver (Rx) procedures are described below.
Receiving signalling:
1. Synchronize to the T2 frame start->Scan RF until pilot P1 is found.
2. Receive signaling from P1->FFT size, P2_type etc.
3. Receive pilot P2 symbols and OSI layer 1 (L1, Physical Layer) signaling. FFT size is needed to know the number of received P2 symbols and P2_type defines the type of P2 symbol. The P2 symbol type includes types for the second generation Digital Video Broadcasting-Terrestrial (T2), next generation handheld (NGH), Multiple Input Multiple Output (MIMO) and Multiple Input Single Output (MISO) systems. From P2, decode first L1_pre signaling which is fixed. This tells about the location and coding of the remaining L1 signaling.
4. Receive OSI layer 2 (L2) signaling from PLP0. L1 signaling contains information how to receive PLP0. PLP0 carries Open System Interconnection (OSI) layer 2 (Data Link Layer) signalling data as a dedicated PLP.
5. Select service. All signaling is now received (L1 and L2). Any service can be now selected and received. PLP number that contains the selected service can be found from L2 signaling.
6. Start receiving PLP.

Receiving service or PLP (signaling is also received here):
1. Receive L1 signaling again. L1 signaling contains dynamic part that tells about the location of each PLP in the frame. Now the location of the desired PLP is known i.e. start of the first burst and RF index if TFS is used, the remaining bursts are separated by RF_shift.
2. Store also the following parameters from L1 signaling: INTERLEAVING_LENGTH, NUM_SUBFRAME, and NUM_RF.
3. Receive all the bursts/slots of the PLP belonging to one interleaver block. INTERLEAVING_LENGTH determines how many frames must be received and NUM_SUBFRAME how many slots are in one frame. For TFS there are NUM_SUBFRAME*NUM_RF slots per frame.
4. Write the received data into the deinterleaver memory. Data can be written into the deinterleaver also slot by slot.
5. Deinterleave and decode data.

There are also other steps not considered above including, for example:
IFFT (Inverse Fast Fourier Transform)
Bit deinterleaver
Frequency deinterleaver
Calculation of soft bits
Synchronization and channel estimation.

In step 1. above, the location of the PLP can be calculated by using BURST_INTERVAL and BURST_LENGTH in the receiver. The start and the end of the burst n is given by START(n)=START(n−1)⊕BURST_INTERVAL, END(n)=START(n)⊕BURST_LENGTH where the addition is done as modulo FRAME_LENGTH, and BURST_LENGTH (or PLP_NUM_BLOCKS) is the length of the burst signaled in L1 signaling parameters.

There can be splitting of the burst in the frame border. If

START(n)>END(n)

the burst is divided into two parts, one part in the end and one in the beginning of the frame. The start for these two bursts are START(n) and 0, and the end FRAME_LENGTH and END(n), respectively.

Figure 5:
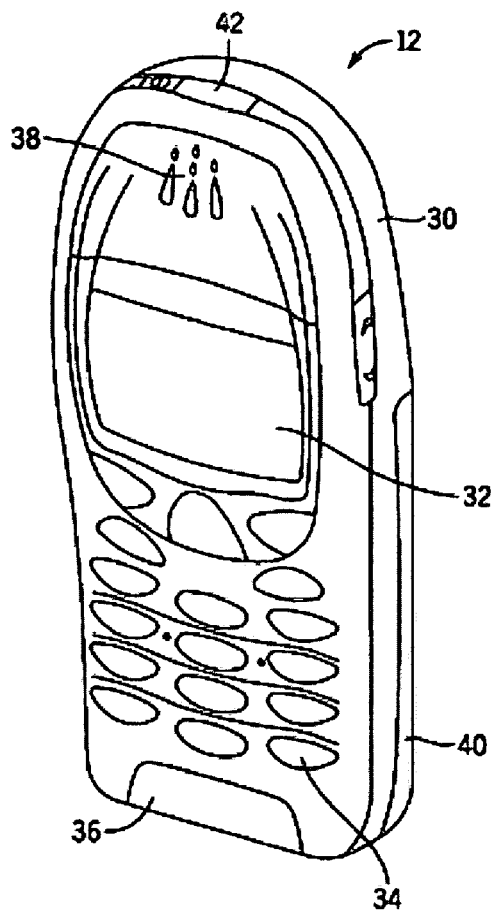
FIG. 5 is a perspective view of an electronic device that can be used in conjunction with the implementation of various embodiments of the present invention.
Figure 6:
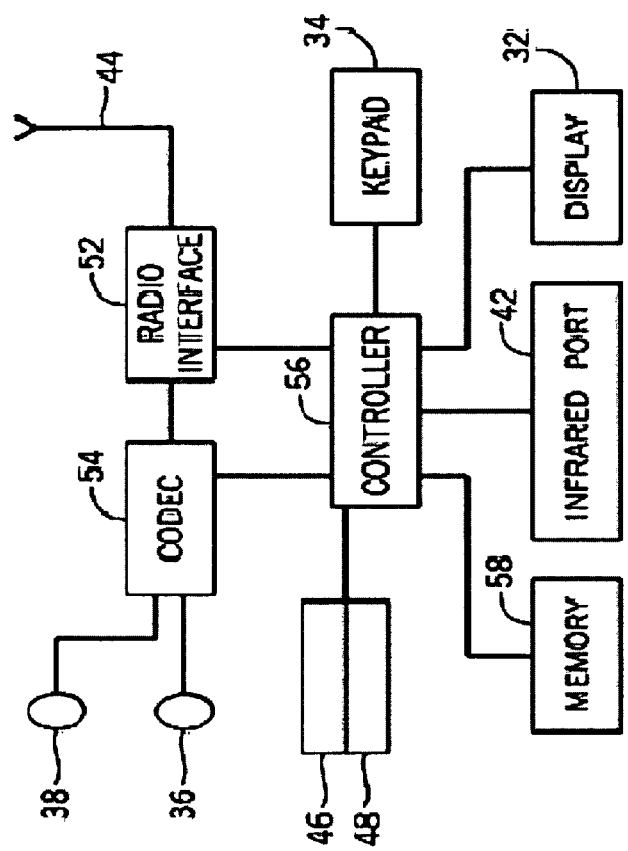
FIG. 6 is a schematic representation of the circuitry which may be included in the electronic device of FIG. 5.

FIGS. 5 and 6 show one representative mobile device 12 within which the present invention may be implemented. It should be understood, however, that the present invention is not intended to be limited to one particular type of electronic device. The mobile device 12 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method, comprising:
   allocating a capacity of a plurality of frames between a first physical layer pipe and at least one second physical layer pipe;
   the first physical layer pipe comprising a plurality of interleaving blocks in the plurality of frames, and
   the at least one second physical layer pipe comprising a single interleaving block in the plurality of frames, wherein the single interleaving block is distributed over a first frame and a second frame of the plurality of frames, and wherein the single interleaving block contains all second physical layer pipe data to be transmitted in the plurality of frames;
   dividing the capacity of the plurality of frames, the first physical layer pipe, and the at least one second physical layer pipe into a plurality of subframes, wherein each of the subframes carries one burst from each of the physical layer pipes;
   selectively time shifting the plurality of bursts such that a defined time shift exists between corresponding bursts in each subframe within the first frame; and
   appending the subframes after each other in a sequence to form the plurality of frames.

2. A computer program product, embodied in a computer-readable non-transitory medium, comprising computer code configured to implement the processes of claim 1.

3. The method of claim 1, wherein each frame includes two or more radio frequency channels, each radio frequency channel including subframes, the method further comprising:
   selectively time shifting one or more of the radio frequency channels such that a defined time shift exists between corresponding radio frequency channels in each frame; and
   for any subframes of a radio frequency channel which have been selectively shifted beyond the end of the frame, cyclically shifting such subframes to the beginning of the frame.

4. A computer program product, embodied in a computer-readable non-transitory medium, comprising computer code configured to implement the processes of claim 3.

5. An apparatus, comprising:
   a processor; and
   a memory unit communicatively connected to the processor and including:
      computer code for allocating a capacity of a plurality of frames between a first physical layer pipe and at least one second physical layer pipe,
      the first physical layer pipe comprisinges a plurality of interleaving blocks in the plurality of frames and,
      the at least one second physical layer pipe comprising a single interleaving block in the plurality of frames, wherein the single interleaving block is distributed over a first frame and a second frame of the plurality of frames, and wherein the single interleaving block contains all second physical layer pipe data to be transmitted in the plurality of frames;
      computer code for dividing the capacity of the plurality of frames, the first physical layer pipe, and the at least one second physical layer pipe into a plurality of subframes, wherein each of the subframes carries one burst from each of the physical layer pipes;
      computer code for selectively time shifting the plurality of bursts such that a defined time shift exists between corresponding bursts in each subframe within the first frame; and
      computer code for appending the subframes after each other in a sequence to form the plurality of frames.

6. The apparatus of claim 5, wherein each frame includes two or more radio frequency channels, each radio frequency channel including subframes, the memory unit further including:
   computer code for selectively time shifting one or more of the radio frequency channels such that a defined time shift exists between corresponding radio frequency channels in each frame; and
   computer code for, for any subframes of a radio frequency channel which have been selectively shifted beyond the end of the frame, cyclically shifting such subframes to the beginning of the frame.

7. A method comprising:
   receiving a radio frequency signal comprising a first pilot signal of a first predetermined type;
   receiving one or more first signaling parameters in the pilot signal;
   receiving a second pilot signal of a second predetermined type based on the one or more first signaling parameters;
   decoding from the received second pilot signal one or more second signaling parameters;
   receiving one or more third signaling parameters for a first physical layer pipe and at least one second physical layer pipe based on the received one or more second signaling parameters, wherein the third signaling parameters indicate a first number of interleaving blocks for the first physical layer pipe in a plurality of transmission frames and a single interleaving block for the at least one second physical layer pipe in the plurality of transmission frames, wherein the single interleaving block is distributed over a first frame and a second frame of the plurality of transmission frames, and wherein the single interleaving block contains all physical layer pipe data provided in the plurality of transmission frames;
   selecting a physical layer pipe; and
   receiving the selected physical layer pipe based on the one or more third signaling parameters.

8. A method according to claim 7, wherein the first signaling parameters comprises second pilot type indication.

9. A method according to claim 7, wherein the second signaling parameters comprises information on receiving a dedicated physical layer pipe carrying data link layer signaling data.

10. A method according to claim 7, wherein the receiving a selected service comprises receiving the selected physical layer pipe carrying the selected service.

11. A method according to claim 10, wherein the receiving the selected service further comprises:
receiving physical layer signaling parameters comprising information on locating each physical layer pipe location in a frame;
storing one or more received physical layer parameters;
receiving data in all slots of the physical layer pipe carrying the selected service;
writing the received data into a deinterleaver memory;
deinterleaving and decoding said data.

12. An apparatus comprising:
a radio interface configured to receive a radio frequency signal comprising:
a first pilot signal of a first predetermined type;
a second pilot signal of a second predetermined type and;
a first physical layer pipe and at least one second physical layer pipe, each carrying data for a service;
a controller configured to decode one or more physical layer pipe signaling parameters from the received second pilot signal, wherein the one or more physical layer pipe signaling parameters indicate a first number of interleaving blocks for a first physical layer pipe in a plurality of transmission frames and a single interleaving block for the at least one second physical layer pipe in the plurality of transmission frames, wherein the single interleaving block is distributed over a first frame and a second frame of the plurality of transmission frames, and wherein the single interleaving block contains all second physical layer pipe data provided in the plurality of transmission frames;
a memory configured to store said one or more physical layer pipe signaling parameters;
an interleaver configured to deinterleave the received data in the received at least one physical layer pipe and;
a decoder configured to decode said data.

13. A computer program product, embodied in a computer-readable non-transitory medium, comprising computer code configured to implement the processes of claim 7.

* * * * *